Figure 1:
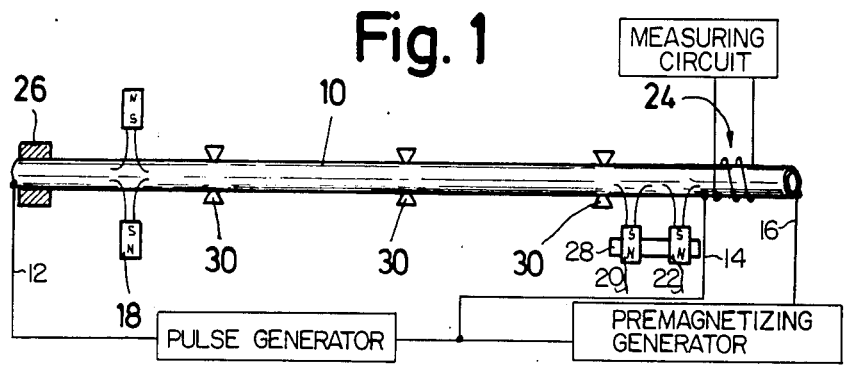

United States Patent [19]

Vinnemann et al.

[11] Patent Number: 4,678,993
[45] Date of Patent: Jul. 7, 1987

[54] DISTANCE MEASURING DEVICE OPERATING WITH TORSIONAL ULTRASONIC WAVES DETECTED WITHOUT MODE CONVERSION

[75] Inventors: Antonius Vinnemann, Stuttgart; Veit Köninger, Neuhausen, both of Fed. Rep. of Germany

[73] Assignee: Gebhard Balluff GmbH & Co., Fed. Rep. of Germany

[21] Appl. No.: 673,473

[22] Filed: Nov. 20, 1984

[30] Foreign Application Priority Data

Nov. 30, 1983 [DE] Fed. Rep. of Germany ....... 3343310

[51] Int. Cl.⁴ .................... G01B 7/14; H03H 9/00; H04B 11/00
[52] U.S. Cl. .................................. 324/208; 333/148
[58] Field of Search .................. 324/207, 208, 209; 333/148, 149; 367/168, 118, 125, 127, 128

[56] References Cited

U.S. PATENT DOCUMENTS 4,071,818 11/1978 Krisst ................................ 324/208

FOREIGN PATENT DOCUMENTS 2833369 2/1980 Fed. Rep. of Germany .
2837014 2/1980 Fed. Rep. of Germany .
2098731 11/1982 United Kingdom .

Primary Examiner—Ernest F. Karlsen
Assistant Examiner—Walter E. Snow
Attorney, Agent, or Firm—Shenier & O'Connor

[57] ABSTRACT

The invention relates to an ultrasonic distance measuring device for linear distance measurement comprising a tube of magnetostrictive material, a magnet displaceable relative to the tube for generating torsional ultrasonic pulses as a function of electrical pulses produced by a pulse generator and travelling along the tube, these torsional ultrasonic pulses serving as position signals, and also comprising an ultrasonic receiver coupled to the tube for converting ultrasonic pulses generated in the tube into electrical signals and a measuring circuit for ascertaining the position of the movable magent as a function of the time interval between the signals obtained from the position signals and at least one respective reference signal generated by the presence of an electrical pulse. In accordance with the invention, the ultrasonic receiver for direct detection of torsional pulses is provided as a section of the tube which is circumferentially magnetized on the basis of remanence and a coil surrounding this section in axial direction.

16 Claims, 4 Drawing Figures

DISTANCE MEASURING DEVICE OPERATING WITH TORSIONAL ULTRASONIC WAVES DETECTED WITHOUT MODE CONVERSION

The invention relates to an ultrasonic distance measuring device for linear distance measurement comprising a tube of magnetostrictive material, a magnet displaceable relative to the tube for generating torsional ultrasonic pulses as a function of electrical pulses produced by a pulse generator and travelling along the tube, the torsional ultrasonic pulses serving as position signals, and also comprising an ultrasonic receiver coupled to the tube for converting ultrasonic pulses generated in the tube into electrical signals and a measuring circuit for ascertaining the position of the movable magnet as a function of the time interval between the signals obtained from the position signals and at least one respective reference signal generated by the presence of an electrical pulse.

An ultrasonic distance measuring device of this type if known from U.S. Pat. No. 3,898,555. This known distance measuring device has an electric wire running through the interior of the tube of magnetostrictive material. Electrical pulses are fed to this wire from the output of a pulse generator. These electrical pulses each trigger an ultrasonic pulse at the point along the tube, at which the magnet is placed for generating the position signals. The ultrasonic pulses consist of a wave packet comprising torsional waves, which is itself detected by a transducer and converted to an electrical signal. The time interval between an electrical signal and a reference signal corresponds to the position of the movable magnet. In the known distance measuring device, the reference signals are electrical signals derived from the electrical pulses. The known distance measuring device operates with an ultrasonic receiver which has two tapes of magnetostrictive material. These tapes are mounted tangentially on the periphery of the tube of magnetostrictive material and are surrounded by transducer coils. The torsional waves of the tube are first converted to longitudinal waves by the tapes, as it is only longitudinal waves which can be directly converted by coils to an electrical signal, and subsequently, an electrical output signal is induced in the coil.

A similar ultrasonic distance measuring device, with which the reference signals are generated with the aid of an additional magnet surrounding the tube and located at a predetermined distance from the transducer, is described in German Offenlegungsschrift No. 31 31 455. This known ultrasonic distance measuring device also operates with an ultrasonic receiver such as that explained above in conjunction with U.S. Pat. No. 3,898,555. The particular advantage of the distance measuring device according to German Offenlegungsschrift No. 31 31 455 is the fact that temperature-dependent changes in the length and propagation times of the tube of mangetostrictive material are compensated in that the reference signals are also obtained from ultrasonic pulses generated at the location of the stationary reference magnet.

An improved embodiment of the distance measuring device according to German Offenlegungsschrift No. 31 31 455 is described in an earlier application of applicant Ser. No. 06/577,848, now abandoned. In this distance measuring device, two reference magnets are provided at a predetermined distance from one another for generating ultrasonic pulses as reference signals. These signals may be evaluated such that any drift of the parameters of the measuring circuit, which is due to temperature or aging, can be compensated to a very high degree. The distance measuring device of this earlier application again operates with an ultrasonic receiver as used in U.S. Pat. No. 3,898,555.

In all the known ultrasonic receivers for torsional pulses, a torsional pulse arriving on the magnetostrictive tube is converted into a longitudinal pulse on the magnetostrictive tapes and the longitudinal pulse induces electrical signals in the coils surrounding the tapes due to the inverse effect of magnetostriction (Villari Effect). It has been shown that with the known ultrasonic distance measuring devices having the ultrasonic receivers described numerous echos occur due to reflection of the ultrasonic pulses on the adjacent end of the tube, in particular when three magnets are used, namely two reference magnets and one position magnet. These echos overlap to a greater or lesser extent and make an exact evaluation of the signals more difficult. It has also been shown that it is relatively expensive to increase the distance between the reference magnets and/or to damp the tube end adjacent the ultrasonic receiver and that this results in a considerable increase in the space required which contrasts with practical use of ultrasonic distance measuring devices of the type in question.

Proceeding on the basis of the prior art and the problems discussed above, the object of the invention is to improve an ultrasonic distance measuring device of the type described at the outset such that detection of the time intervals between the ultrasonic pulses travelling along the tube is particularly exact.

This object is accomplished according to the invention in that the ultrasonic receiver for direct detection of torsional pulses is provided as a section of the tube which is circumferentially magnetized on the basis of remanence and a coil surrounding this section in axial direction.

The inventive construction of an ultrasonic distance measuring device or rather its ultrasonic receiver is based on the following considerations. A longitudinal magnetic field is generated by the position magnet and the reference magnet or magnets along the magnetostrictive tube. This means that the magnetic dipoles or their groups, the Weiss domains, in the tube are aligned in the longitudinal direction of the tube. When an electrical pulse travels along the tube, or through this tube when the electrical conductor is arranged in the interior of the tube, the circumferential magnetic field generated by the electrical (current) pulse is superimposed by the longitudinal field of the permanent magnet located at the relevant position to form a helical field. The magnetic dipoles, or Weiss domains, consequently turn into this new field direction, whereby a deformation of the material occurs in the helical direction in accordance with the Joule Effect (magnetostriction). This results in an ultrasonic pulse which has a tangential or circumferential component and a longitudinal component and which travels in both directions at sonic velocity. These torsional waves were previously converted into longitudinal waves by ultrasonic receivers, such as that described, for example, in U.S. Pat. No. 3,898,555. Only then could they be converted into electrical signals by a coil.

The essential feature of the present invention is the fact that these torsional waves may be detected directly by a coil surrounding the tube in axial direction, i.e.

without use of a mode converter. This was not possible with the arrangements previously known since the torsional waves did not generate a detectable electrical signal in an axially aligned coil.

Detection is possible only when the section of the tube surrounded by the coil is circumferentially magnetized prior to arrival of a torsional wave. This circumferential magnetization does not result in any signal in the axially aligned coil.

When an ultrasonic pulse in the form of a torsional pulse induces a helical mechanical deformation of the circumferentially magnetized tube in the region of the coil of the ultrasonic receiver, which surrounds the tube, individual volume elements of the tube are twisted and the magnetic dipoles contained therein are thereby turned out of their circumferential direction. This causes an alteration in the field in the direction of the coil axis which results in an electrical signal being induced in the coil in accordance with the laws of induction. Consequently, it is possible to detect torsional waves directly without the use of a mode converter.

Circumferential magnetization of the tube in the inventive ultrasonic distance measuring device is achieved in that the remanence of the magnetostrictive material is exploited, i.e. prior to arrival of a torsional wave the magnetostrictive tube is premagnetized by suitable means. Due to manifestations of remanence, a circumferential magnetization of the tube is maintained after removal of the premagnetizing field. As described above, this circumferential magnetization receives an axial component when the torsional wave impinges thereon.

In development of the invention, it has proven favourable for premagnetizing means to be provided for generating a circumferential magnetization in the first section of the tube surrounded by the coil, prior to each measurement, with the aid of a current pulse travelling along this section and for connections for the pulse generator to be arranged such that electrical pulses are generated which travel along a second section of the tube offset relative to the first section.

The inventive separation of the section of the magnetostrictive tube impinged by the output pulses from the section of the tube surrounded by the coil, to which special electrical pulses, designated as regenerating pulses, are applied to generate the circumferential magnetization of the magnetostrictive material, is particularly advantageous. At the time of measurement, no interference signals caused by an output pulse from the pulse generator are induced in the coil. With respect to interference signals, the following considerations are taken as a basis. Even a small longitudinal magnetic field in the region of the coil of the ultrasonic receiver, for example the stray field of an adjacent reference magnet, magnetizes the magnetostrictive material of the tube to a corresponding degree. When an electrical pulse from the pulse generator travels along the tube under these conditions this leads, analogously to generation of a measuring signal, to the magnetic dipoles being turned or their direction altered. Since this alteration in the direction of the magnetic field is detected directly by the coil of the inventive ultrasonic receiver without the dissipative mechanism of magnetostriction or rather the Villari effect, the consequent interference voltage induced is possibly a good deal higher than an information signal generated by an ultrasonic pulse to be evaluated on the basis of the Villari Effect. The oscillations thus generated in the ultrasonic receiver may considerably effect exact measurement of the position signals and the reference signals generated by reference magnets. This disadvantage is avoided when the electrical pulses generated by the pulse generator during measurement do not travel along that section of the magnetostrictive tube which is surrounded by the coil and when the circumferential magnetization generated in the section surrounded by the coil is generated by means of special regenerating pulses between measurements.

With regard to generation of reference signals, the inventive ultrasonic distance measuring device may, as in the earlier systems, operate with one or two reference magnets or, as in the distance measuring device of U.S. Pat. No. 3,898,555, with the output pulses from the pulse generator itself. The principal advantages of the inventive ultrasonic receiver are not affected thereby.

Advantageous developments of the invention are the subject matter of subclaims.

Figure 2:
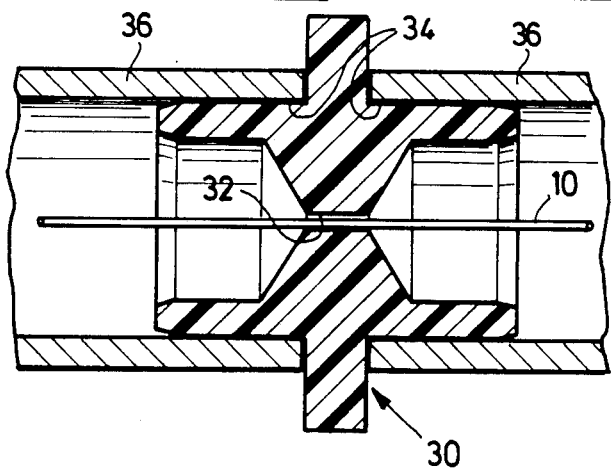
Figure 3A:
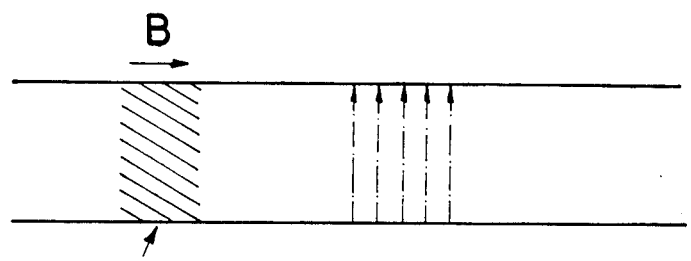
Figure 3B:
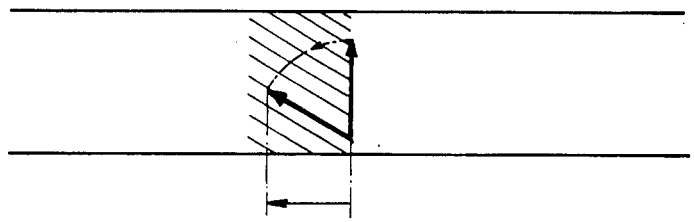

Additional details and advantages of the invention are explained in more detail in the following, in conjunction with the drawings, in which FIG. 1 is a schematic side view of the essential parts of a preferred embodiment of an invention ultrasonic distance measuring device;

FIG. 2 is an enlarged partial cross section through a support means for the magnetostrictive tube of the ultrasonic distance measuring device of FIG. 1 and FIG. 3a and are schematic illustrations of the basic FIG. 3b principles of the ultrasonic distance measuring device of FIGS. 1 and 2.

FIG. 1 shows in detail a magnetostrictive tube 10 with three electrical connections 12, 14, 16 which are connected to the tube 10 by, for example, soldering or welding such that damping is low and so as to be electrically conductive. A first section of the tube 10 between connections 14 and 16 is surrounded by a coil 24. One position magnet 18 and two reference magnets 20, 22 are arranged along a second section of the tube 10 between connections 12 and 14. The end of the tube 10 adjacent connection 12 is encircled by a damping device 26 which is shown only schematically and may consist, for example, of a plurality of rubber discs of varying hardness. Finally, FIG. 1 shows a quartz plate 28, to which the two reference magnets 20, 22 are secured at a predetermined distance from one another.

The ultrasonic distance measuring device according to FIG. 1 is operated as follows. A current pulse is first generated and produces a remanent circumferential magnetization in the first section of the tube 10 between connections 14 and 16, this first section being surrounded by the coil 24 and serving at the same time as an electrical conductor. Subsequently, a pulse generator generates an electrical pulse which travels along the second section of the tube 10 which also serves as an electrical conductor. This electrical pulse triggers an ultrasonic pulse at the position magnet 18 and at each of the two reference magnets 20, 22. The ultrasonic pulses result in corresponding electrical signals between the connections of the coil 24 due to the correlations mentioned at the outset. In development of the invention, it is thereby particularly advantageous when the length of the tube 10 on the side of the coil 24 remote from the magnets 18, 20, 22 is selected such that the half-wave electrical signal, which is induced by an ultrasonic pulse and has a first polarity, is immediately followed by a half-wave signal of opposite polarity which is induced by the relevant ultrasonic pulse reflecting off the end of the tube and travelling back through the coil 24. With this development, a zero passage detector may be connected to the connections of the coil 24. This enables the propagation time of the ultrasonic pulses to be measured with particular accuracy. Moreover, the signals may be evaluated in the ultrasonic distance measuring device by using two reference magnets provided at a predetermined distance from one another for generating ultrasonic pulses as reference signals. The time difference between the reference signals is used as a gauge value for the evaluation of the propogation time of the ultrasonic pulse generated by the position magnet to compensate for any drift of the parameters of the measuring circuit which is due to temperature or aging.

With regard to the special function of the inventive ultrasonic receiver, with which the coil axially surrounds the tube 10, reference is made in addition to FIG. 3a and FIG. 3b. These figures clearly illustrate how a change in the magnetic field (FIG. 3b) is brought about when the torsional stress wave of an ultrasonic pulse arrives at the tangentially or circumferentially magnetized section of the magnetostrictive tube 10 which is surrounded by the coil 24 (FIG. 3a). This change in the magnetic-field induces an electrical voltage in the coil 24. The direction of travel of the torsional stress wave, or rather the ultrasonic pulse, is indicated in FIG. 3a by arrow B. It is also clear from FIGS. 3a and 3b that when the torsional stress wave is reflected beyond the area of circumferential magnetization, which is induced by a current pulse between connections 14 and 16, the direction of the mechanical stress in the torsional wave is turned through 180° such that the returning ultrasonic pulse, or rather the echo of the ultrasonic pulse, will cause a change in the magnetic field in the opposite direction. This results in an electrical signal in the coil 24, the polarity of which is opposed to the polarity of the first signal generated in the coil 24. As mentioned above, it is therefore possible, when the length of the tube beyond the coil 24 is suitably selected, to obtain two half-wave electrical signals of opposite polarity on the basis of an ultrasonic pulse and its echo and to detect the zero passage between the signals. The propagation time measurements may then be carried out with extreme precision since the zero passage is not affected by distortions and amplitude variations of the half waves.

With regard to the mechanical construction of the inventive ultrasonic distance measuring device, the design of FIG. 2 has proven successful. This Figure shows that the magnetostrictive tube 10 may be supported at suitable intervals by support rings 30. These rings have a relatively narrow central opening 32, through which the tube 10 passes with a slight clearance, and define at the same time annular shoulders 34 which serve to support sections 36 of a protective tube surrounding the magnetostrictive tube 10. The support rings 30 and the sections 36 of the protective tube may consist, for example, of a suitable plastics material. FIG. 1 merely shows the support rings 30 schematically as supports for the tube 10.

To avoid any interference of the ultrasonic pulse travelling along the magnetostrictive tube 10, in particular any undesired echos, in the region of the connection points for the electrical connections 12, 14, 16, very fine and lightweight wires are used, according to the invention, for these electrical connections. The wires are preferably secured to the magnetostrictive tube 10 by spot welding. It has been shown that the use of thin connection wires secured to the tube 10 by spot welding does not cause any interference of the ultrasonic pulse travelling along the tube. As the spot-welded connection also holds reliably during continuous operation, the transmission of electrical signals to the magnetostrictive tube 10 is guaranteed to be free from interference and low in resistance.

An advantageous form of welding is performed by using a laser so that electrical conductors are bonded by laser welding.

Finally, it is, in principle, possible to use a rod of magnetostrictive material instead of a magnetostrictive tube. The use of a solid rod would, however, have the disadvantage that the ultrasonic pulses would be damped to a considerable degree as a result of the large inert mass.

What is claimed is:

1. An ultrasonic distance measuring device for linear distance measurement comprising a tube of magnetostrictive material, a magnet displaceable relative to the tube for generating torsional ultrasonic pulses as a function of electrical pulses applied to the tube by a pulse generator and travelling along the tube, said torsional ultrasonic pulses serving as position signals, and also comprising an ultrasonic receiver coupled to the tube for converting ultrasonic pulses generated in the tube into electrical signals and a measuring circuit coupled to said ultrasonic receiver for ascertaining the position of the movable magnet as a function of the time interval between the electrical signals obtained from the position signals and at least one respective reference signal generated by the presence of said electrical pulses wherein the ultrasonic receiver for direct detection of torsional pulses is provided as a section of the tube (10) which is circumferentially magnetized on the basis of remanence by premagnetizing means and a coil (24) surrounding said section in axial direction.

2. Ultrasonic distance measuring device as defined in claim 1, wherein said premagnetizing means are provided for generating a circumferential magnetization in a first section of the tube (10) surrounded by the coil (24), prior to each measurment, with the aid of a current pulse travelling along said section, and wherein connections (12, 14) for the pulse generator are arranged such that electrical pulses are generated which travel along a second section of the tube (10) offset relative to said first section.

3. Ultrasonic distance measuring device as defined in claim 1, wherein the length of the tube (10) on the side of the coil (24) remote from the movable magnet (18) is selected such that half-wave electrical signals induced in the coil (24) by an ultrasonic pulse and its echo from the end of the tube follow directly one after the other and define a zero passage.

4. Ultrasonic distance measuring device as defined in claim 2, wherein the length of the tube (10) on the side of the coil (24) remote from the movable magnet (18) is selected such that half-wave electrical signals induced in the coil (24) by an ultrasonic pulse and its echo from the end of the tube follow directly one after the other and define a zero passage.

5. Ultrasonic distance measuring device as defined in claim 1, wherein at least one reference magnet (20, 22) is provided for generating the reference signals.

6. Ultrasonic distance measuring device as defined in claim 2, wherein at least one reference magnet (20, 22) is provided for generating the reference signals.

7. Ultrasonic distance measuring device as defined in claim 5, wherein two reference magnets (20, 22) are provided and said magnets are spaced from one another and fixed to a connecting element having a low coefficient of heat expansion.

8. Ultrasonic distance measuring device as defined in claim 6, wherein two reference magnets (20, 22) are provided and said magnets are spaced from one another and fixed to a connecting element having a low coefficient of heat expansion.

9. Ultrasonic distance measuring device as defined in claim 1, wherein the tube (10) is supported, so that damping of the tube is low, by support rings (30) arranged at predetermined intervals and having a central opening (32) for the tube, said support rings having shoulders (34) for supporting sections (36) of a protective tube surrounding the tube (10) of magnetostrictive material.

10. Ultrasonic distance measuring device as defined in claim 2, wherein the tube (10) is supported, so that damping of the tube is low, by support rings (30) arranged at predetermined intervals and having a central opening (32) for the tube, said support rings having shoulders (34) for supporting sections (36) of a protective tube surrounding the tube (10) of magnetostrictive material.

11. Ultrasonic distance measuring device as defined in claim 1, wherein the magnetostrictive tube (10) is itself provided as a conductor for electrical signals and wherein the electrical connections (12, 14, 16) for the magnetostrictive tube (10) are designed as thin electric conductors having a low mass.

12. Ultrasonic distance measuring device as defined in claim 2, wherein the magnetostrictive tube (10) is itself provided as a conductor for electrical signals and wherein the electrical connections (12, 14, 16) for the magnetostrictive tube (10) are designed as thin electric conductors having a low mass.

13. Ultrasonic distance measuring device as defined in claim 11, wherein the electric conductors are bonded by spot welding to the cover surface of the magnetostrictive tube (10).

14. Ultrasonic distance measuring device as defined in claim 12, wherein the electric conductors are bonded by spot welding to the cover surface of the magnetostrictive tube (10).

15. Ultrasonic distance measuring device as defined in claim 11, wherein the electric conductors are bonded by laser welding to the cover surface of the magnetostrictive tube (10).

16. Ultrasonic distance measuring device as defined in claim 12, wherein the electric conductors are bonded by laser welding to the cover surface of the magnetostrictive tube (10).

* * * * *